Sept. 28, 1971  F. W. WILLARDSON  3,608,208

TEACHING MACHINE

Filed June 18, 1969

FRED W. WILLARDSON
INVENTOR.

BY
Sherman & Shallowy

United States Patent Office 3,608,208
Patented Sept. 28, 1971

3,608,208
TEACHING MACHINE
Fred W. Willardson, R.D. 8, Lexington, Ohio 44904
Filed June 18, 1969, Ser. No. 834,382
Int. Cl. G09b 5/02
U.S. Cl. 35—9R                                6 Claims

ABSTRACT OF THE DISCLOSURE

A teaching machine having improved means to move a film from a first viewing position to one of a plurality of possible second viewing positions wherein the means to move the film includes means, dependent on an operator's response while in the first viewing position, to stop the film in a second viewing position corresponding to said response.

---

The invention relates generally to mechanical aids to teaching wherein the mechanical aid gives varying instructions depending upon the responses of a student operating the aid.

This invention relates more specifically to a device and method for controlling a teaching machine wherein instructional material is contained on a film which is visually presented to an operator.

In the recent past educators have become aware of serious defects in the instructional techniques employed in training and educational areas. The conventional textbooks and explanatory lecture are not adequate for large classes. Each student needs a degree of individual attention and as the size of the class grows the available time for individual instruction decreases. Furthermore, teachers feel a demand on them for extra-class work such as experimentation, publishing, and "good-will" efforts to keep their status in schools and communities. Thus, for a combination of reasons the text-lecture approach becomes increasingly less desirable.

Considering the individual student's requirements, if an instructor is not available for personal confrontation, it is desirable to give some artificial means of allowing the student to study at his own pace. Many times the friends or relatives of the student cannot or will not supply the lacking attention and effort. Accordingly, mechanical teaching aids are being used which enable a student to get personal attention and to learn at his own rate, thereby avoiding possible failures and the consequent embarrassment.

In the early development of mechanical teaching aids, the devices were complex and expensive. Also, they were extremely limited in the range of material taught and in the efficiency of the teaching process.

Various forms of teaching aids have been proposed in the past which incorporate various features recognized by educators as being desirable. One feature is to give a prompt report to the student in order to keep his interest and enthusiasm at a high level. Where it is desired to correlate the machine report to an operators' response, the report must be quickly rendered as noted above and also the subsequent response must be quickly rendered. It is another desirable feature that the student operator be required to obtain a correct response before moving on to subsequent frames. Further aims are to provide a simple device operable by young and unskilled personnel and to provide a device capable of operation without distracting adjacent operators.

The present invention relates to the type of teaching aid which sequentially presents a series of questions to an operator and then is adapted to produce one of a plurality of possible responses depending on the operator's answer (response) to the first question.

Although aids have been heretofore used which provide varying presentations of instructional material, the devices used to control these aids were undesirably complex and prone to failure.

One previously employed device for controlling the machine provides codes instructing the machine through a memory and scanner system to search for a film frame with a particular identification code. The machine then moves the film, reading the identification code of each frame as it goes by, until it recognized the particular code for which it searches. Upon finding the searched-for code, the machine stops moving the film and projects the new lesson frame.

A disadvantage of this device is that elaborate circuitry is required. A memory system must be provided for storing the identification code of the subject frame, and a scanner system provided for reading the identification code of the intermediate frames as the film is moved, a comparator system must be provided to compare the stored identification code with the read identification code and a device must be provided to stop the film when the stored identification code and the read identification code correspond indicating the subject frame has been reached.

Another previously used method of machine control provides an array of switches which the student used to indicate his answer to a question presented on the film. Each switch instructs the machine to move the film a previously determined number of frames, with the particular number being dependent on the circuitry of the machine and the mechanical frame registering device.

A disadvantage of this method of machine control is that in preparing the lesson material a frame must be provided for each possible answer even though several of the frames may contain identical information since the machine must move a given number of frames for each switch. While there can only be one correct response to a question, it is the practice in such mechanized instruction to provide several incorrect responses. Identical information is often adequate for the several incorrect responses, but a device which controls film movement by a fixed counting system associated with each switch requires a separate frame for each incorrect response in order to prevent the student from learning the counting sequence associated with each switch and nullifying any teaching prospects. For example, if the student were given several possible answers to a question or problem, one of which is associated with a particular switch and all others associated with another switch, the student would immediately know which was the correct answer by the mechanics of the machine.

Another disadvantage is that a large array of switches must be provided to give the machine a large range of subject matter. This switch array can cause confusion for the student and may result in his closing the wrong switch and being presented information not related to the question or problem being studied at the moment.

Briefly, the device employed in this invention comprises a coded area associated with each frame of information. The code pattern instructs the machine to move the film a predetermined number of frames to the next relevant frame of information when the student responds by closing one of a plurality of switches. The student cannot know how many frames the machine will move the film upon closing any of the particular switches since this information is contained in code form on the film and the code is in an area which cannot be seen by the student. One switch can be made to move the film one number of frames and all other switches can be made to move the film another number of frames without the student being aware that such is the case. But this is due to the codes on the film, not to a fixed mechanical counter associated with each switch as was described above. Only as many answer switches are required as the maximum number of answer choices deemed desirable for proper instructional procedure. Very simple circuitry can accomplish moving the film the desired number of frames since it is only required that the machine detect the number of frames of movement desired (by the switch which the student chooses) and then count the frames as the film moves by.

In view of the need for a mechanical teaching aid and the defects in previously used devices, it is therefore a primary object of this invention to provide a mechanical teaching aid which replaces the function of a teacher-counselor.

Another object is to provide the subject teaching aid which can accommodate a wide range of topics and information.

Still another object is to provide a teaching aid of the subject type which can automatically determine the students level of knowledge and thereafter teach him and test him only in the deficient areas.

Further objects are to provide a teaching aid which is simple, relatively inexpensive, compact, easy to operate and service, foolproof, and decorative in appearance.

Another object is to provide a teaching aid which enables an operator to view a question and a plurality of answers, to chose an answer, and to receive a speedy indication of his success or failure.

Another object is to provide a teaching aid adapted to use a coded film wherein the code contains hidden information as to the position of the correct answer.

A complementary object is to provide a teaching machine which performs the function of a mechanical counter without giving the operator any indication of this fact.

These and other objects as well as alternative advantages will become apparent to those skilled in the art from a reading of the following specification with reference to the drawings wherein like numerals designate like elements and wherein the machine control function of this invention can better be understood with reference to the accompanying drawings.

Figure 1:
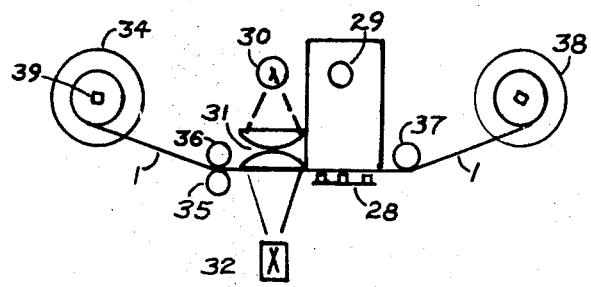
FIG. 1 is a schematic diagram of a system incorporating the controls of this invention.
Figure 2:
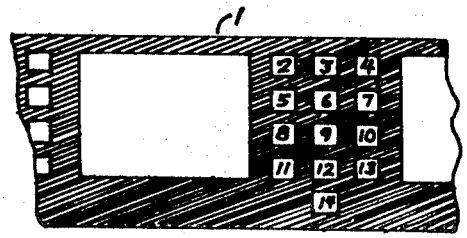
FIG. 2 is an enlarged view of a section of a coded film adapted for use in this invention.
Figure 3:
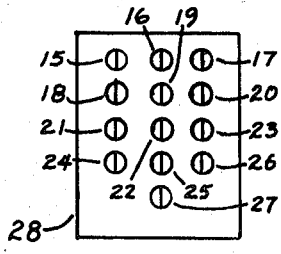
FIG. 3 is an enlarged view of a code detector according to this invention.
Figure 4:
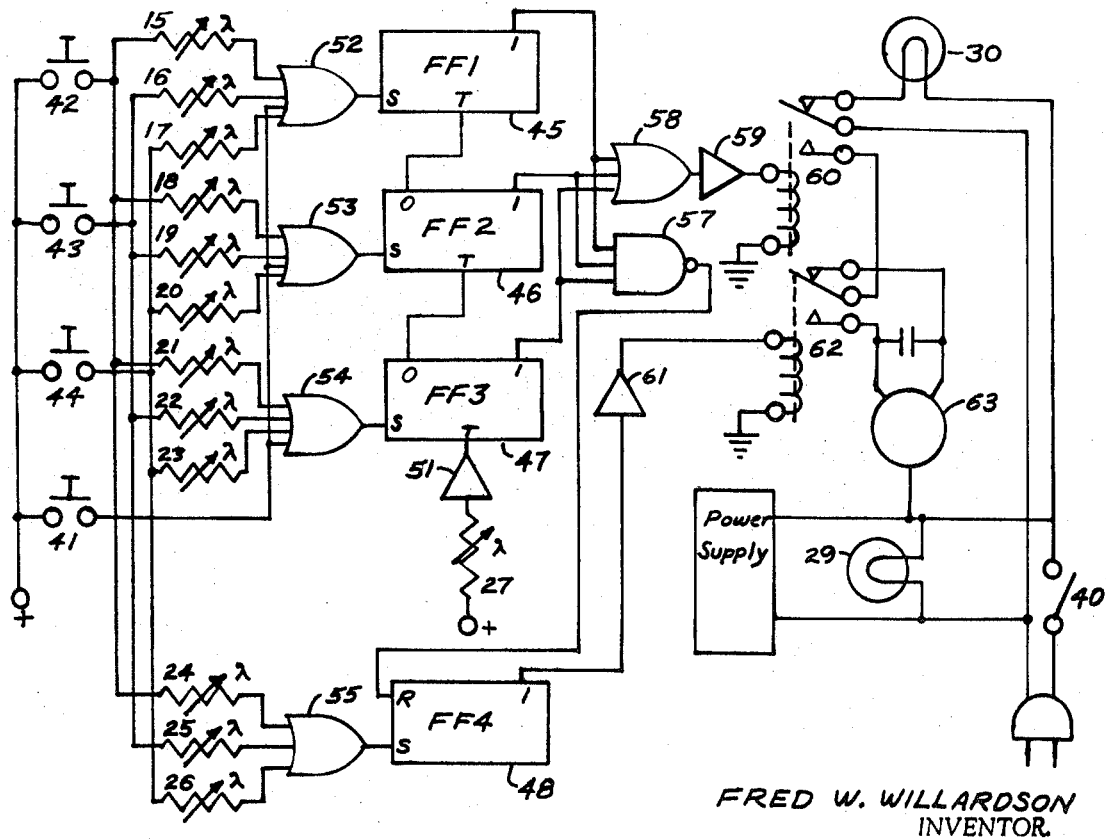
FIG. 4 is a diagram of an electrical circuit for controlling the machine of this invention.

Referring to FIG. 1, the operation of this device is shown. A reel 34 containing film 1 with instructional material is placed on a spindle 39. To initially start the machine, main power switch 40 is closed and momentarily loading switch 41 is closed. The closing of switch 41 sends signals through OR circuits 52, 53, and 54 causing the binary flip-flops FF1, 45, FF2, 46 and FF3, 47 to transfer from a 0 to a 1 output. Their 1 outputs are detected by OR circuit 58 which feeds an input to amplifier 59 whose output operates relay 60. Current will flow through the normally open contacts, through the normally closed contacts of relay 62, to motor 63. This motor is connected by conventional devices to roller 35 causing it to rotate in a direction for forward movement of the film. The operator then places the end of film 1 between rollers 35 and 36 which will pick up the film and push it through the machine past roller 37. The film is coded as indicated in FIG. 2 by providing the transparent numbered sectors. As soon as light sensitive detector 27 sees light through area 14 of the first frame on the film (see FIG. 2), it causes amplifier 51 to produce an output which will trigger the flip-flop FF3, 47 changing it from 1 output to 0 output state. The leading edge of the 0 output of flip-flop FF3, 47 will trigger flip-flop FF2, 46 from 1 to 0 output state. The leading edge of the 0 output of flip-flop FF2, 46 will trigger flip-flop FF1, 45 from 1 to 0 output state. When all three flip-flop 1 outputs have been removed from the OR circuit 58, this circuit changes its output so that amplifier 59 will no longer hold relay 60 in operative position. Thus, the contacts of relay 60 are opened, thereby interrupting current flow to the motor and stopping the film motion.

The operator will then fasten the end of film 1 to reel 38 and will wind up film until all slack is removed from the film. Reel 34 is driven by a suitable tensioning drive to cause it to rotate clockwise until a slight tension is placed on film 1. Similarly reel 38 is driven by suitable tensioning drive to cause it to rotate counterclockwise until tension is placed on film 1. Neither of the drives for reels 34 and 38 have sufficient torque to move the film but only serve to hold the film taut. Thus, reel 38 will automatically wind up slack film during the feeding step.

When relay 60 is inoperative, its closed contacts feed current to projector lamp 30 producing light. Light from lamp 30 is collected by the lens system 31 which directs it onto the film, and through the transparent areas of the film to projection lens 32 and screen 33 such that information contained on frame 1 of the film is now visible to the student-operator. The student-operator will read this lesson, choose a response and then close one of the switches 42, 43 or 44 as directed by instructions on the film.

Assuming the viewed frame contains instructions to close switch 42, i.e., the operator decides the correct response is that response associated with switch 42 and that the film has been coded with area 11 dark and areas 2, 5 and 8 transparent (see FIG. 2), the light detectors 15, 18 and 21 will feed a signal through OR circuits 52, 53 and 54 to preset flip-flops FF1, 45, FF2, 46 and FF3, 47, changing them from 0 to 1 output states. Light detector 24 receives no light and therefore produces no output. In the same manner as before, circuits 58, 59, 60, and 62 will cut off lamp 30 and start motor 63 and move film 1 forward. When light detector 27 sees the clear area 14 on the next frame code section, flip-flops FF3, 47, FF2, 46 and FF1, 45 will be triggered stopping the film and projecting that frame of information.

If this next frame contains a question which gives the student-operator a choice of answers and if we assume he made his choice by closing switch 43 and that the code has areas 9 and 12 dark and 3 and 6 transparent light detectors 16 and 19 would change flip-flops FF1, 45 and FF2, 46 from 0 to 1 output state. The 1 outputs from flip-flops FF1, 45 and FF2, 46 would start motor 63 through circuits 58, 59, 60 and 62. The next frame code area 14, through light detector 27 would trigger flip-flop FF3, 47 changing it from the 0 output to 1 output state leaving all 3 flip-flops in a 1 output condition. The next frame code area 14 would again trigger flip-flop FF3, 47 changing it from 1 output to 0 output which would trigger FF2, 46 from a 1 output to a 0 output which would trigger FF1, 45 from a 1 output to a 0 output, thus stopping the film as described above. Thus, it will be appreciated that the signals from detectors 15–23 are operative to preset the counter formed by flip-flops 45, 46 and 47 such that a predetermined number of frames will be moved past the detectors, which frames are counted via signals from detector 27.

Code areas 11, 12 and 13, and light detectors 24, 25 and 26 serve to move the film in a reverse direction. If when switches 42, 43 or 44 are closed and the light detectors 24, 25 or 26 associated with these switches receive light through transparent code areas 11, 12 or 13, flip-flop FF4, 48 will be changed from 0 output to 1 output state through OR circuit 55. This 1 output, through amplifier 61 will operate relay 62 and direct any current from relay 60 to the reverse terminal of motor 63 and cause it to rotate in the reverse direction. This continues until all flip-flops 45, 46 and 47 are triggered to 0 output state. NAND circuit 57 would detect loss of 1 outputs from flip-flops 45, 46, and 47 and produce a signal which would reset flip-flop FF4, 48 to 0 output state and allow relay 62 to drop out.

In this manner the machine can move film forward or reverse from 1 to 7 frames depending upon how code areas of the film are arranged and upon which switch is closed.

It is obvious that additional circuitry could be added to increase the number of frames the machine would move. With 2 flip-flops the capacity would be 3 frames, 3 flip-flops would give 7 frame capacity, 4 flip-flops would give 13 frame capacity, etc. Also, any number of answer switches could be used with suitable arrangement of code areas, light detectors and OR circuit inputs. Also, all answer switches need not have the capability of controlling all flip-flops. Circuit simplicity may make it desirable to reduce the number of light detectors and OR circuit inputs for some switches without materially affecting the effectiveness of the lessons. Also, other physical arrangements of code patterns and light detectors could be used with equal effectiveness. Other projection systems could be used with equal effectiveness, and other methods of film transport could be used with equal effectiveness.

From the above description of the invention and the associated illustrative examples it will at once be obvious to those skilled in the art that a novel and improved device for controlling teaching machines has been developed. The specific examples given herein are not limiting and it is to be understood that the invention is defined by the claims.

Having described my invention, I claim:

1. A teaching device for visually projecting educational material comprising
    movable film means including a plurality of frames, each of said frames carrying educational material and a code associated therewith;
    said code including an area identifying each of said frames and a plurality of sectors representing movement of said film means a predetermined number of frames;
    detector means responsive to said code to provide first signals corresponding to said identifying areas and second signals corresponding to said plurality of sectors;
    switch means connected with said detector means and adapted to be actuated by a student viewing the projected educational material;
    driving means for transporting said movable film means past said projecting means; and
    control means connected with said detector means and said driving means, said control means being operable to energize said driving means to move said predetermined number of frames past said detector means, said predetermined number being determined from said second signals, said control means including counting means responsive to said first signals to count said frames moving past said detector means and said control means deenergizing said driving means once said predetermined number of frames have been counted whereby movement of said film means is controlled by counting moving frames in accordance with said sectors of said code of one of said frames.

2. The teaching device of claim 1 wherein said counting means counts each of said first signals received from said detector means, said counting means being preset by said second signals to define said predetermined number of frames to be moved past said detector means.

3. The teaching device of claim 2 wherein said sectors of said code are positioned to define a plurality of groups, said switch means includes a plurality of switches, and said detector means includes a plurality of groups of detectors, each of said switches being connected with each of said detectors in one of said groups, each of said groups of detectors being responsive to one of said groups of sectors to provide said second signals to preset said counting means when one of said switches is actuated whereby said counting means is preset in accordance with which one of said switches is actuated.

4. The teaching device of claim 3 wherein said driving means is operative to transport said film means in forward and reverse directions, and said control means includes a circuit connected with one of said detectors in each of said groups and responsive to second signals from said detectors to control the transport direction of said driving means.

5. The teaching device of claim 4 wherein said counting means includes a plurality of bistable circuits each connected with a gate for setting the state thereof, each of said gates connected with one of said detectors of each of said groups.

6. The teaching device of claim 1 wherein said driving means is operative to transport said film means in forward and reverse directions, and said control means includes means responsive to said second signals from said detector means to control the transport direction of said driving means.

References Cited

UNITED STATES PATENTS

| | | | |
|---|---|---|---|
| 3,137,948 | 6/1964 | Wyckoff | 35—9 |
| 3,355,819 | 12/1967 | Hannah et al. | 35—9 |
| 3,482,329 | 12/1969 | Le Marr | 35—9 |

WILLIAM H. GRIEB, Primary Examiner